United States Patent
Huizingh

(10) Patent No.: US 12,084,228 B2
(45) Date of Patent: Sep. 10, 2024

(54) TRANSPORT CONTAINER HAVING OFFSET SIDEWALL SLOTS

(71) Applicant: Schoeller Allibert GmbH, Schwerin (DE)

(72) Inventor: John Huizingh, Vlagtwedde (NL)

(73) Assignee: Schoeller Allibert GmbH, Schwerin (DE)

( * ) Notice: Subject to any disclaimer, the term of this patent is extended or adjusted under 35 U.S.C. 154(b) by 29 days.

(21) Appl. No.: 17/298,939

(22) PCT Filed: Dec. 5, 2019

(86) PCT No.: PCT/EP2019/083851
§ 371 (c)(1),
(2) Date: Jun. 1, 2021

(87) PCT Pub. No.: WO2020/115225
PCT Pub. Date: Jun. 11, 2020

(65) Prior Publication Data
US 2022/0081167 A1    Mar. 17, 2022

(30) Foreign Application Priority Data
Dec. 6, 2018   (EP) ..................... 18210749

(51) Int. Cl.
*B65D 25/54*     (2006.01)
*B65D 1/22*      (2006.01)
(Continued)

(52) U.S. Cl.
CPC .............. *B65D 25/54* (2013.01); *B65D 1/22* (2013.01); *B65D 21/0213* (2013.01);
(Continued)

(58) Field of Classification Search
CPC .... B65G 2201/0285; B65G 2201/0258; B65D 21/045; B65D 25/205; B65D 21/0213; B65D 1/22; B65D 25/54; B65D 21/046
(Continued)

(56) References Cited

U.S. PATENT DOCUMENTS 3,420,402 A * 1/1969 Frater ................. B65D 21/045
                                                  206/520
4,106,624 A * 8/1978 Thurman ............. B65D 21/046
                                                  206/507
(Continued)

FOREIGN PATENT DOCUMENTS

DE      2139194 A1    2/1973
DE      3411540 A1   10/1985
(Continued)

OTHER PUBLICATIONS

Office Action received in Canadian Application No. 3,120,641 dated Oct. 18, 2022, 3 pages.
(Continued)

*Primary Examiner* — Chun Hoi Cheung
(74) *Attorney, Agent, or Firm* — Christopher A. Rothe; Culhane PLLC

(57) ABSTRACT

A transport container for receiving and transporting goods within a transport or distribution system by conveyor belts and/or roller conveyors. The transport container includes a base from which four sidewalls extend. At least two opposing sidewalls each have a predefined code section to apply a machine-readable code, in particular a barcode or a QR code, and at least one opening, in particular a plurality of slots extending from the base to the upper edge of the sidewall. The openings in the two opposing sidewalls, in particular those openings which are located directly adjacent to and/or at the same height as the predefined code sections, are arranged offset from one another. A system can include
(Continued)

the transport container, a conveyor system, and a scanning device.

16 Claims, 3 Drawing Sheets

(51) Int. Cl.
*B65D 21/02* (2006.01)
*B65D 25/20* (2006.01)

(52) U.S. Cl.
CPC .... *B65D 25/205* (2013.01); *B65G 2201/0258* (2013.01); *B65G 2201/0285* (2013.01)

(58) Field of Classification Search
USPC ............... 206/507, 459.5, 511, 512; 220/661
See application file for complete search history.

(56) References Cited

U.S. PATENT DOCUMENTS

| | | | | |
|---|---|---|---|---|
| 4,523,681 A | * | 6/1985 | Kreeger | B65D 21/041 206/507 |
| 4,749,273 A | | 6/1988 | Reinhold | |
| 5,035,326 A | * | 7/1991 | Stahl | B65D 21/041 206/505 |
| 5,287,966 A | * | 2/1994 | Stahl | B65D 21/041 206/509 |
| 5,752,602 A | * | 5/1998 | Ackermann | B65D 21/046 206/505 |
| 8,474,617 B2 | * | 7/2013 | Wiedmann | B65D 21/045 206/427 |
| 11,174,075 B2 | * | 11/2021 | Poran | B65D 85/34 |
| 2012/0241349 A1 | * | 9/2012 | Koefelda | B65D 1/34 206/507 |
| 2013/0026057 A1 | * | 1/2013 | Shapiro | B65D 21/0212 206/509 |
| 2015/0151875 A1 | * | 6/2015 | Hassell | B65D 1/34 206/557 |

FOREIGN PATENT DOCUMENTS

| | | |
|---|---|---|
| DE | 3521894 A1 | 1/1987 |
| DE | 4228204 A1 | 3/1994 |
| DE | 202007009366 U1 | 11/2007 |
| EP | 3456645 A1 | 3/2019 |
| GB | 1354834 A | 6/1974 |
| WO | 2017177347 A1 | 10/2017 |

OTHER PUBLICATIONS

Extended European Search Report received in European Application No. 18210749.0-1016 dated Apr. 9, 2019, with translation, 18 pages.
International Search Report received in International Application No. PCT/EP2019/083851 dated Jan. 28, 2020, with translation, 8 pages.
Office Action received in European Application No. 18210749.0-1016 dated Jul. 9, 2020, with translation, 19 pages.
Written Opinion received in International Application No. PCT/EP2019/083851 dated Jan. 28, 2020, with translation, 16 pages.

* cited by examiner

TRANSPORT CONTAINER HAVING OFFSET SIDEWALL SLOTS

CROSS-REFERENCE TO RELATED APPLICATION(S)

This application is the United States national phase entry of International Application No. PCT/EP2019/083851, filed Dec. 5, 2019, and claims the benefit of priority of European Application No. 18210749.0, filed Dec. 6, 2018. The contents of International Application No. PCT/EP2019/083851 and European Application No. 18210749.0 are incorporated by reference herein in their entireties.

FIELD

The present invention relates to a transport container, in particular to a container with offset sidewall slots. Furthermore, the invention relates to a system comprising a conveyor system and a scanning device in which such containers can be transported.

BACKGROUND

In mail distribution centers, delivery service companies, mail order companies or in other goods handling or logistics centers, goods or merchandise are usually transported by means of transport and distribution systems. The goods and merchandise are transported, inter alia, in transport containers. It may be necessary to measure the fill level of such a transport container, for example via an ultrasonic distance measuring device or via an optical identifier, e.g. via a laser device. When using laser devices, correct measurements can be made at high conveying speeds in the transport and distribution system. Furthermore, a laser can simultaneously read barcodes or QR codes applied to the transport container, which contain, for example, further information about the transported goods.

A method and a device for determining the mass flow rate of materials to be conveyed for bulk materials transported on conveyor belts or belt conveyors is already known from DE 34 11 540 A1. In this process, a laser radiates from above onto the transported goods and is reflected. Depending on how much bulk material is on the conveyor belt at the time of measurement, the laser is reflected differently and the reflected signal thus contains information from which the filling cross-section of the transported material can be determined.

Therefore, a device for determining the quantity of conveyed bulk material, which rests directly on a conveyor belt, is known. However, it may be necessary to convey transported goods/loads, such as packages or letters, in transport containers whose upper opening may be closed by a lid. In this case, the fill level of the transport container can no longer be measured from above.

SUMMARY

It is therefore an object of the invention to overcome or minimize the disadvantages of the prior art and, in particular, to configure a transport container that is conveyable in a transport and distribution system in such a way that it is possible to measure the fill level of the transport container via optical identification and, at the same time, to avoid errors when reading a barcode and/or QR code applied to the transport container.

A transport container according to the invention is suitable for receiving goods, such as letters and packages, in order to be able to transport these goods within the scope of a transport or distribution system via conveyor belts and/or roller conveyors. The transport container comprises an, in particular rectangular, container base body with sidewalls and a bottom. Here, a respective predetermined code section for attaching a machine-readable code, in particular a barcode or a QR code, is provided on two opposite sidewalls. In addition, at least one opening, in particular a plurality of slots extending from the bottom to the upper edge of the sidewall, is provided in the two opposite sidewalls. According to the invention, the openings of the two opposite sidewalls are configured in such a way that they are located directly next to and/or at the same height of the predetermined code sections, and are arranged offset from each other.

The openings/slots are provided to prevent reading errors due to an unwanted reflection of a light beam from occurring when the barcode/QR code is read on the outside of the container. The light beam is usually emitted by a scanning device or laser device whose purpose it is to measure the fill level of the container and to simultaneously read-out the barcode or QR code.

Advantageously, the transport container is configured in such a way that the code sections of the two opposite sidewalls are offset from each other. When the container is empty, the laser beam enters the container through the slot on one sidewall and finally hits the inside of an opposite code section. However, if the container is filled, the laser beam hits the transported goods and thus generates different information than in the case of an empty container.

Furthermore, it is conceivable that the plurality of slots are evenly spaced and the slots in one sidewall are offset by half the distance from the slots in the other sidewall. The fill level measurement of a transport container with such offset slots is particularly easy to implement. A regular distance between the slots also makes it easier to read-out the barcodes/QR codes.

In addition, the two opposite sidewalls may be configured point-symmetrically with respect to each other, which simplifies the manufacture of such a container.

It is also conceivable that the code section is limited on both sides by a slot in order to ensure that reading errors can be prevented as effectively as possible.

The object underlying the invention is further solved by a system comprising a conveyor system, one or more transport containers according to the invention transported via the conveyor system, and a scanning device arranged transversely to the transport direction of the transport container for reading a machine-readable code applied to a sidewall of the transport container. The sidewall provided with the code and the opposite sidewall of the transport container do have openings that are not aligned with each other, and the scanning device is oriented in such a way that, when a read signal output by the scanning device passes through an opening located in the sidewall, it hits either a load located in the transport container or an inner wall section of the opposite sidewall of the transport container.

BRIEF DESCRIPTION OF THE DRAWING FIGURES

The present invention is described in more detail hereinafter based on an embodiment with reference to the accompanying drawings, wherein.

DETAILED DESCRIPTION

The figures are merely schematic in nature and only serve for understanding the invention. Identical elements are assigned the same reference signs. The embodiment is only given as an example and the invention is not limited to this.

Figure 1:
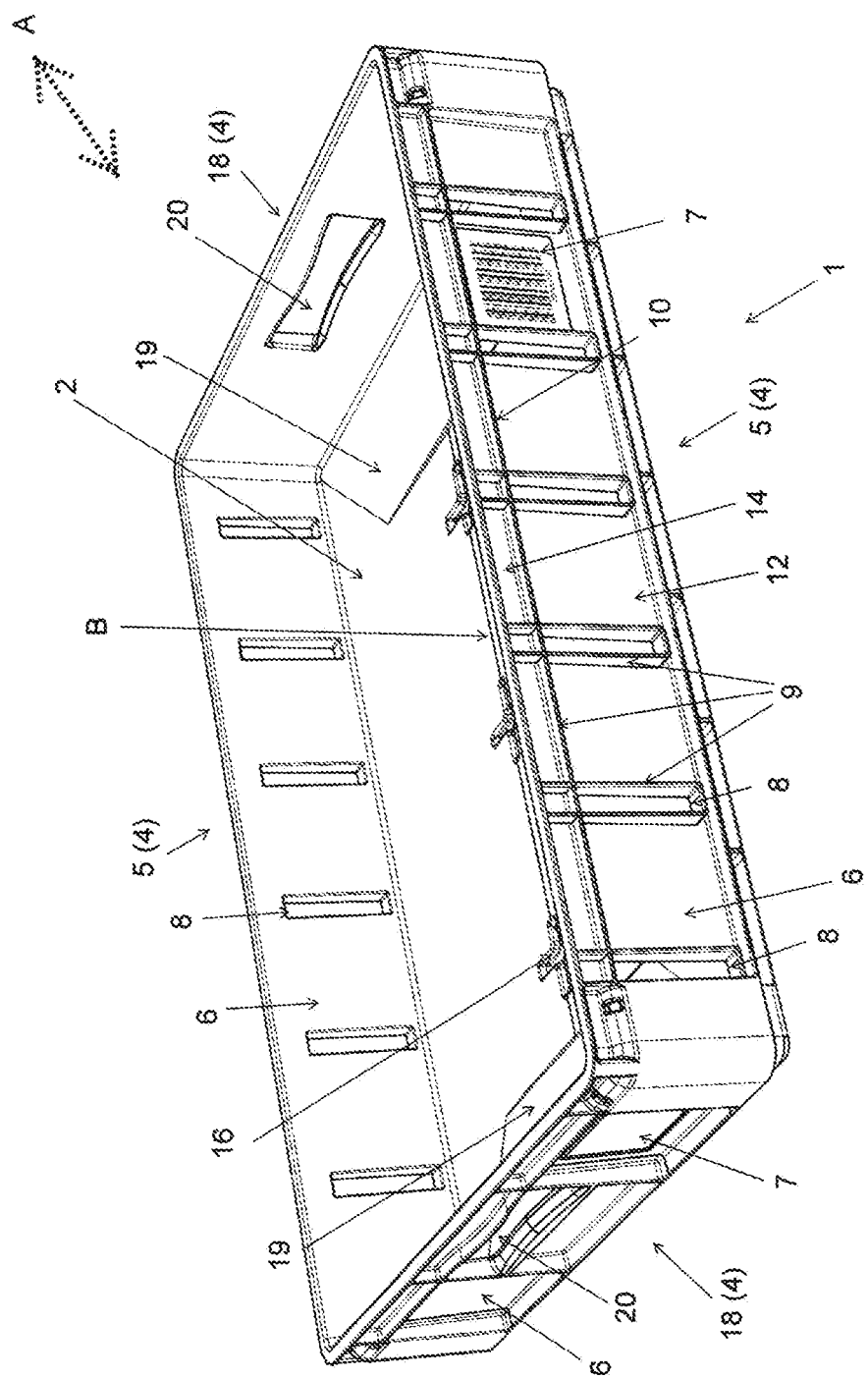
FIG. 1 shows a perspective view of the transport container according to the invention.

FIG. 1 shows the transport container/container 1 in a perspective view. The container 1 has a rectangular bottom 2, from which four sidewalls 4 extend vertically, forming a circumferential sidewall of the container 1. The two opposite longitudinal walls 5 are divided into a plurality of code sections or sidewall sections 6. In this case, each longitudinal wall 5 has six sidewall sections 6. Each sidewall section 6 of the container 1 may have a machine-readable code 7, for example a barcode and/or a QR code. Here, by way of example, a barcode 7 is provided on one of the sidewall sections. The plurality of sidewall sections 6 is separated from each other by slot-like openings/slots 8. The openings 8 of one longitudinal wall 5 are offset from the openings 8 of the opposite longitudinal wall 5. Accordingly, the sidewall sections 6 of one longitudinal wall 5 are also offset from the sidewall sections 6 of the opposite longitudinal wall 5. The slots 8 extend between a container bottom 2 and an upper edge of the sidewalls 5 without being in contact with the container bottom 2 and the upper edge of the sidewalls 5. Thus, in this embodiment, the container 1 has a circumferential upper edge. Each sidewall section 6 is (slightly) offset from the lateral surface of the container 1 towards the inside of the container and is provided with a frame-like bar 9 extending its lateral edges and upper edge in the direction of its outer side.

It can be seen that the sidewall sections 6 are each divided into two by a transverse bar 10, which is formed continuously across all sidewall sections 6. Here, the transverse bar 10 is arranged in such a way that a lower first sidewall section area 12 of the sidewall section 6 is larger than an upper second sidewall section area 14. Thus, the larger (first) sidewall section area 12 may be provided with a barcode 7 (see FIG. 1). The smaller (second) sidewall section area 14, on the other hand, may remain free. At the same time, the second sidewall section areas 14 are separated from each other by indentations 15, which are aligned in the vertical direction with the slots 8. As can be seen in FIG. 1, however, these indentations 15 are no through-openings between the inside of the container and the outside of the container. The indentations 15 are also laterally limited by the frame-like bar 9. On the upper side, the indentations 15 are limited by the upper edge of the sidewalls 5.

A scanning device, which is not shown here, is provided outside the transport container 1, is spaced from a longitudinal wall 5 and is arranged transversely to the transport direction (transport direction here is in the direction of the longitudinal walls, see arrow A) of the container 1 and emits a light beam/laser beam which hits, for example, on a sidewall section 6 having a barcode 7 and then reads it. In this case, the slots 8 arranged next to this sidewall section 6 prevent a reading error when reading the barcode 7. Alternatively, the light beam passes through a slot 8 and in this case measures the fill level of the container 1. If the container 1 is empty, the beam hits a sidewall section 6 of the opposite longitudinal wall 5. If the container 1 is filled, the beam hits the corresponding transported goods, so that the reflection path of the beam in this case is shorter than with an empty container 1.

The container bottom 2 has a plurality of (three) cross-shaped through holes 16. The through holes 16 are arranged along the central longitudinal axis B of the container 1, which is centrally parallel to the longitudinal walls 5. The cross-shaped through holes 16 contribute to good ventilation of the container 1 and can also or alternatively serve as drainage openings when the container 1 is rinsed/cleaned, for example.

The other two sidewalls 4, which are no longitudinal walls 5, are referred to as front walls 18. Starting from the front walls 18, a bottom section 19 chamfered from the sidewalls 18 towards the center of the container extends along the bottom 2. This bottom section 19 has the shape of a symmetrical trapezoid whose longer base side is approximately as long as the length of the front wall 18. When cleaning/rinsing the container 1 with a liquid, the bottom section 19 may serve to direct the liquid towards the center of the container so that it can easily flow out of the container 1 via the through holes 16. A respective (ergonomic) handle 20 is formed axially symmetrically to the vertical center axis of the front walls 18, said handle 20 being configured as a continuous opening in the two front walls 18. A further code section 6 is arranged to each side of the handle 18, which is, however, not limited by slots. Here, one of these two code sections 6 has a barcode 7 in its first sidewall section area 12.

Figure 2:
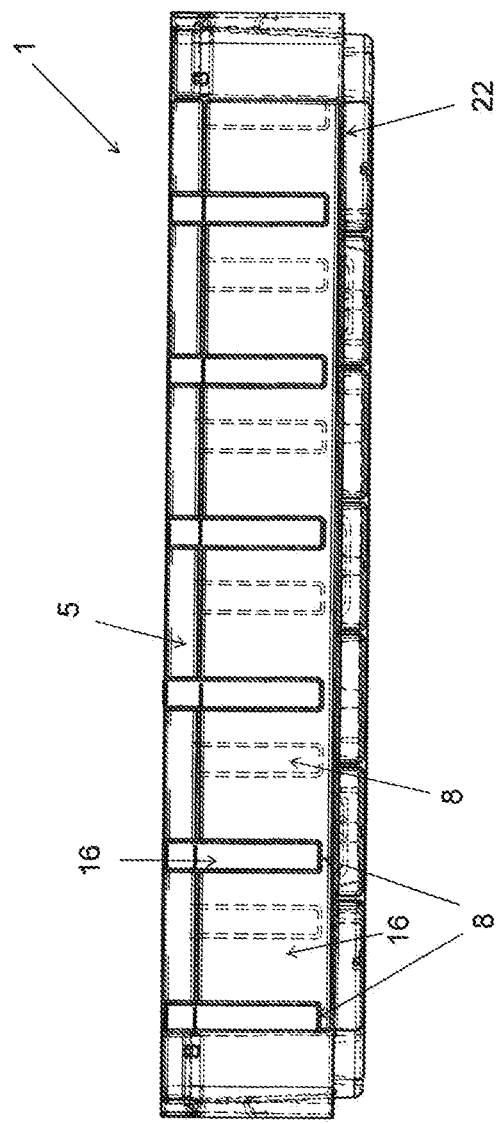
FIG. 2 shows a side view of the transport container, wherein the slots of the rear sidewall in the top view are shown schematically next to the slots of the front sidewall in the top view.

FIG. 2 shows the container 1 in a top view. The slots 8 of the rear longitudinal wall 5 can each be seen as a dashed line, which is shown between two slots 8 of the frontal longitudinal wall 5 (which is opposite the rear longitudinal wall 5). This illustration makes it clear that the slots 8 of the frontal longitudinal wall 5 are offset from the slots 8 of the rear longitudinal wall 5. Therefore, in the case of an empty container 1 as shown herein, the inside of the sidewall sections 6 of the rear longitudinal wall 5 can be seen through the slots 8 of the frontal longitudinal wall 5. Furthermore, it can be seen that the sidewalls 4 are recessed in their area near the bottom and thus form a circumferential stacking border 22. The width of the stacking border 22 advantageously corresponds to the width of the sidewalls 4. In this case, the container 1 can be placed on an identical or compatible container in such a way that its bottom area projects into the lower container, its stacking border 22 rests on the upper edges of the sidewalls of the lower container and the sidewalls 4 of the (upper) container 1 are aligned with the sidewalls of the lower container.

Figure 3:
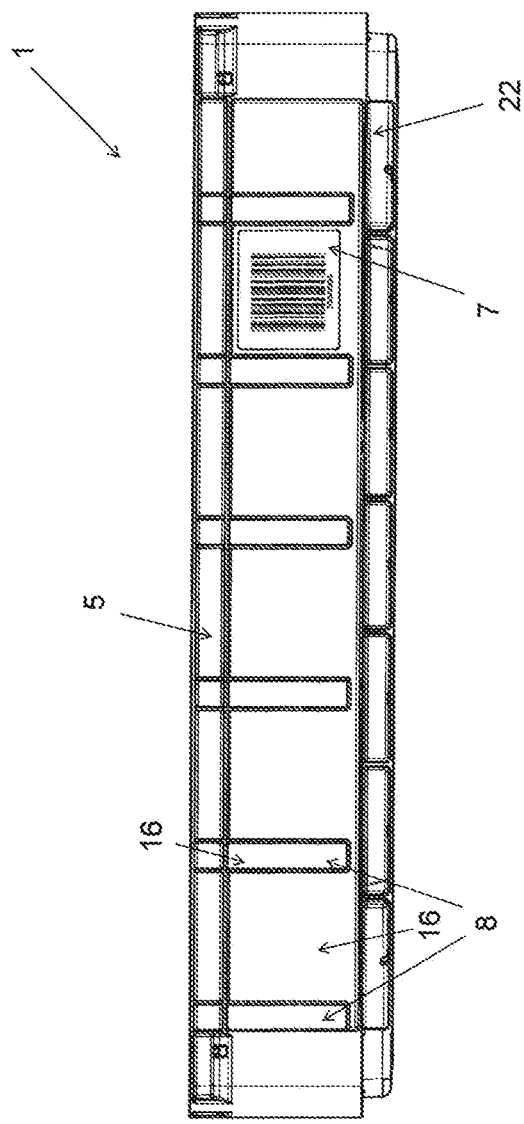
FIG. 3 shows a side view of the transport container.

FIG. 3 shows the container 1 in a top view without schematically depicting the rear longitudinal wall 5. Here, too, it can be seen that each slot 8 of the frontal longitudinal wall 5 is opposite a sidewall section 6 of the rear longitudinal wall 5. The stacking border 22 can also be seen.

The invention claimed is:

1. A transport container for receiving goods in order to be able to transport the goods within a scope of a transport or distribution system via conveyor belts and/or roller conveyors, the transport container comprising:
   a bottom from which four sidewalls extend, the four sidewalls comprising a first sidewall, a second sidewall opposite the first sidewall, a third sidewall, and a fourth sidewall opposite the third sidewall;

the first sidewall comprising a plurality of first sidewall sections, at least one of the first sidewall sections being a first code section with a first machine-readable code on the first code section;

the second sidewall comprising a plurality of second sidewall sections, at least one of the second sidewall sections being a second code section with a second machine-readable code on the second code section;

a plurality of first openings provided in the first sidewall, the plurality of first openings comprising pairs of first openings, each pair of first openings bordering opposite sides of one of the first sidewall sections; and a plurality of second openings provided in the second sidewall, the plurality of second openings comprising pairs of second openings, each pair of second openings bordering opposite sides of one of the second sidewall sections, the first openings being misaligned with the second openings so that each first opening is positioned opposite to an opposing second sidewall section of the plurality of second sidewall sections, each second opening is positioned opposite to an opposing first sidewall section of the plurality of first sidewall sections, and no first opening is positioned opposite to any of the second openings, each first opening being narrower in width than each second sidewall section, and each second opening being narrower in width than each first sidewall section, such that each first opening is adapted to pass light from a scanning device positioned outside of the transport container through the first sidewall so that the light hits the opposing second sidewall section of the plurality of second sidewall sections, and such that each second opening is adapted to pass light from the scanning device positioned outside of the transport container through the second sidewall so that the light hits the opposing first sidewall section of the plurality of first sidewall sections, the first openings being evenly spaced apart, and the second openings being evenly spaced apart, and the first code section being arranged between two of the first openings, and the second code section being arranged between two of the second openings, wherein each first opening defines a first perimeter bordered by a first frame that extends outwardly from said first opening and the first wall, and wherein each second opening defines a second perimeter bordered by a second frame that extends outwardly from said second opening and the second wall.

2. The transport container according to claim 1, wherein the first sidewall sections and the second sidewall sections are misaligned.

3. The transport container according to claim 1, wherein the first openings comprise a plurality of first slots, and the second openings comprise a plurality of second slots, and wherein the plurality of first slots are misaligned with the plurality of second slots.

4. The transport container according to claim 1, wherein the first and second sidewalls are point-symmetrical with respect to each other.

5. The transport container according to claim 1, wherein the transport container is configured for receiving letters or packages.

6. The transport container according to claim 1, wherein the bottom of the transport container is rectangular.

7. The transport container according to claim 1, wherein the first machine-readable code and the second machine readable code are barcodes or QR codes.

8. The transport container according to claim 1, wherein the first openings comprise a plurality of first slots and the second openings comprise a plurality of second slots, the plurality of first slots extending between the bottom to an upper edge of the first sidewall without intersecting the bottom and the upper edge of the first sidewall, and the plurality of second slots extending between the bottom to an upper edge of the second sidewall without intersecting the bottom and the upper edge of the second sidewall.

9. The transport container according to claim 1, wherein:
at least some of the first openings are located directly next to and/or at the same height of the first code section,
at least some of the second openings are located directly next to and/or at the same height of the second code section, and
said at least some of the first openings are misaligned with said at least some of the second openings.

10. The transport container according to claim 1, wherein the first openings are misaligned with the second openings as seen in a direction orthogonal to the first and second sidewalls.

11. The transport container according to claim 1, wherein each of the first openings faces a continuous or non-perforated wall portion of the second sidewall and each of the second openings faces a continuous or non-perforated wall portion of the first sidewall.

12. The transport container according to claim 1, wherein each first opening is formed as a first slot vertically perforating the first sidewall, each second opening is formed as a second slot vertically perforating the second sidewall, the first slots being parallel to each other, and the second slots being parallel to each other.

13. The transport container according to claim 1,
wherein, when a light beam or laser beam from a scanning device is aimed at the first code section, the pair of first openings that border the first code section limit a reflection of said light beam or laser beam from the first sidewall such that the reflection is limited to the first code section to prevent a reading error, and
wherein, when said light beam or laser beam from said scanning device is aimed at the second code section, the pair of second openings that border the second code section limit a reflection of said light beam or laser beam from the second sidewall such that the reflection is limited to the second code section to prevent a reading error.

14. A transport container for receiving goods and transporting goods within a transport or distribution system, the transport container comprising:
a bottom, a first sidewall, and a second sidewall opposite the first sidewall,
the first sidewall defining a plurality of first vertical slots comprising pairs of first vertical slots,
the first sidewall comprising a plurality of first sidewall sections, each first sidewall section bounded on two sides by one of the pairs of first vertical slots,
the second sidewall defining a plurality of second vertical slots comprising pairs of second vertical slots,
the second sidewall comprising a plurality of second sidewall sections, each second sidewall section bounded on two sides by one of the pairs of second vertical slots, at least one of the first sidewall section and the second sidewall section being a code section with a machine-readable code on the code section;

the first vertical slots being misaligned with the second vertical slots such that none of the first vertical slots is aligned with any of second vertical slots, each of the first vertical slots being positioned opposite to one of the second sidewall sections, and each of the second vertical slots being positioned opposite to one of the first sidewall sections, each of the first vertical slots being narrower in width than each of the second sidewall sections, and each of the second vertical slots being narrower in width than each of the first sidewall sections, such that each of the first vertical slots is adapted to pass light from a scanning device positioned outside of the transport container through the first sidewall so that the light hits one of the second sidewall sections, and such that each of the second vertical slots is adapted to pass light from a scanning device positioned outside of the transport container through the second sidewall so that the light hits one of the first sidewall sections, the first vertical slots being evenly spaced apart, and the second vertical slots being evenly spaced apart, and the first code section being arranged between two of the first vertical slots, and the second code section being arranged between two of the second vertical slots, wherein each first vertical slot defines a first perimeter bordered by a first frame that extends outwardly from said first vertical slot and the first wall, and wherein each second vertical slot defines a second perimeter bordered by a second frame that extends outwardly from said second vertical slot and the second wall.

15. The transport container according to claim 14, wherein, when a light beam or laser beam from a scanning device is aimed at the code section, the first vertical slots and/or second vertical slots that bound said code section limit a reflection of said light beam or laser beam from the first sidewall and/or second sidewall such that the reflection is limited to said code section to prevent a reading error.

16. The transport container according to claim 14, wherein each first vertical slot is bordered on four sides by one of the first frames, and each second vertical slot is bordered on four sides by one of the second frames.

* * * * *